Dec. 8, 1959     J. P. MILLIRON     2,915,846
FISH CATCHING DEVICE
Filed May 20, 1957
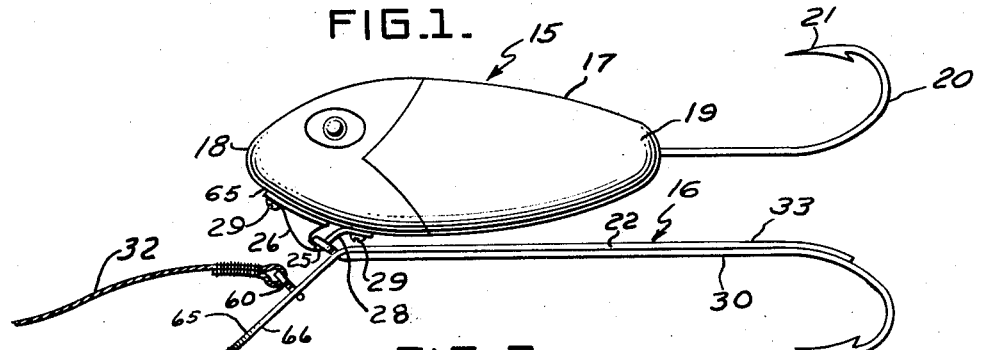
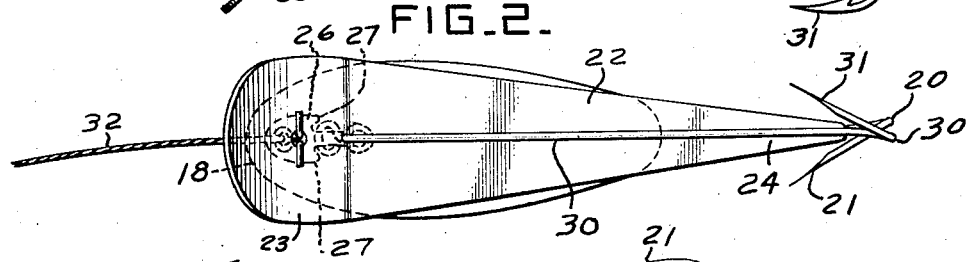
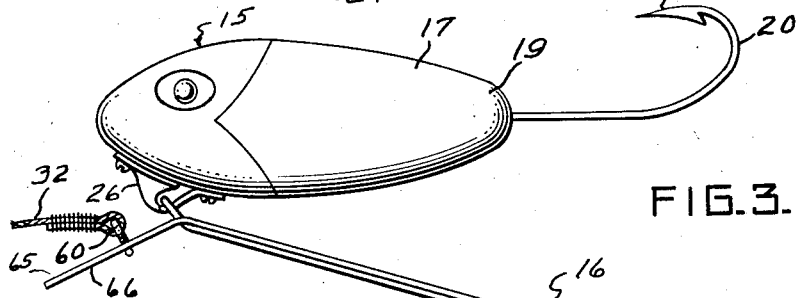
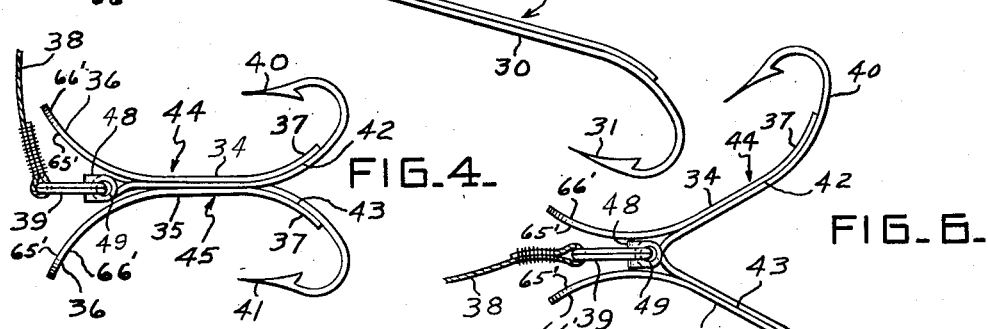
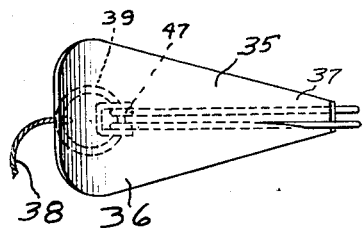
INVENTOR
JAMES P. MILLIRON
BY *Richard L. Underwood*
ATTORNEY United States Patent Office 2,915,846
Patented Dec. 8, 1959

2,915,846

FISH CATCHING DEVICE

James P. Milliron, Vandergrift, Pa.

Application May 20, 1957, Serial No. 660,100

2 Claims. (Cl. 43—42.04)

My invention relates to a fish catching device which is designed to cause increased setting of a hook when the fish attempts to discharge the device by forcing water out of its mouth.

One of the problems faced by fishermen is the proper setting of a hook in a fish's mouth and the maintenance of this hook setting as the fish fights and attempts to eject the hook from its mouth.

When a fish takes a bait or food into its mouth it tends to draw the food in by sucking in water. The water is then discharged through its gills. When a bait is taken and a hook is partially set, the fish will attempt to discharge the hook by forcing water from its mouth. My invention utilizes these natural physical reactions of a fish to aid the fisherman in establishing a strong set of a hook in the fish's mouth.

My invention provides a fish catching device which includes two hingedly connected members having longitudinally extending bodies from the trailing ends of which extend hook portions. The hook portions extend in diametrically opposite directions transversely of their longitudinally extending bodies. At least one of the bodies is provided with a substantially planar setting surface of predetermined area which is adjacent to the other body when the device is in closed position.

When a fish takes the device in its mouth and attempts to throw the device by discharging water from its mouth, the force of the water on the setting surface causes the members to swing relatively away from each other on their hinge connection thereby increasing the set of the hook portions. The bodies are designed to assume a closed position when pulled through the water. In certain environments, no bait or lure will be required to attract fish, as the device itself will serve this purpose.

Various other objects and meritorious features of my invention will be apparent from the following description taken in conjunction with the drawings wherein like numerals refer to like parts throughout the figures and wherein:

Fig. 1 is a side elevation of one form of my invention in closed position;

Fig. 2 is a bottom view of Fig. 1;

Fig. 3 is a side elevation of the device of Fig. 1 in open set condition;

Fig. 4 is a side elevation of another form of my invention in closed position;

Fig. 5 is a bottom view of Fig. 4; and

Fig. 6 is a side elevation of the device of Fig. 4 in open set condition.

Referring now to Figs. 1–3 it will be seen that the fish catching device of my invention includes two members generally indicated by numerals 15 and 16. First member 15 has a first longitudinally extending body 17 with a leading end 18 and a trailing end 19. From its trailing end 19 a first U-shaped hook portion 20 extends transversely outwardly of the longitudinally extending body 17, the hook bill 21 itself extending forwardly toward the leading end of the body.

In the embodiment shown in Figs. 1–3 the first member is in the form of a plug and a second member 16 is hingedly connected to the body 17 of the first member 15. The second member includes a second longitudinally extending body 22 which is in the form of a plate having a shape somewhat like a kite with the leading end 23 being substantially wider than the trailing end 24. The leading end 23 extends forwardly and outwardly from the leading end 18 of the body 17 to provide stability of the device as it travels through water, the pulling line 32 being connected to plate 22 by eye clip 60. A hinge eye 25 on the forward end of hook portion 30 passes under a hinge clip 26 mounted near the leading end 18 of the first member 15.

The hinge clip has a narrow portion 28 on which the hinge eye 25 is actually mounted, transverse flanges 27 providing stops for limiting the pivotal action of the second member 16. Suitable attaching means such as screws 29 hold the hinge clip 26 to the body 17.

The hook portion 30 is fixedly attached by solder, adhesives, etc., to the plate 22 and a hook bill 31 extends rearwardly of the trailing end 24. It will be noted that the hook portion 30 extends in a transverse direction opposite to the first hook portion 20 and that the hinging means connecting the members tends to maintain the proper orientation of the hook portions.

Upon drawing the fish catching device of Figs. 1–3 through the water by means of line 32 connected to the leading end of plate 22 by eye clip 60, the two bodies 17 and 22 are forced into a side-by-side closed position as shown in Fig. 1. When a fish takes the bait and attempts to discharge the bait by forcing water out of its mouth, the substantially planar setting surface 33 of predetermined area which is positioned adjacent the body 17 receives the force of the discharged water and is thereby pivoted on the hinge means into the open set position shown in Fig. 3. The water forced between the body 17 and the body 22 provides an effective force on the setting surface 33 to accomplish the setting of the hooks 21 and 31 in the fish's mouth.

Referring now to Figs. 4, 5 and 6, it will be seen that another embodiment of my invention utilizes two kite-like plates, namely, a first plate 34 and a second plate 35. Each of these plates has a leading end 36, 36 and a trailing end 37, 37. The leading ends are wider than the trailing ends to aid in the proper orientation of the bait upon being pulled through the water by a line 38 which is attached to a base or ring 39.

As seen in Fig. 4 the trailing ends 37, 37 of the plates 34 and 35 are curved transversely outwardly in conformance with the U-shaped hook portions 40 and 41. The first plate 34 has a setting surface 42 of predetermined area which is in substantially face-to-face relation with a similar second setting surface 43 of the second plate 35. The first member 44 and the second member 45 are each independently hingedly mounted on the base 39 by means of extensions from their leading ends formed into hinge eyes 47 which are mounted on the ring 39. The holder 48 in the form of a U-shaped clip with holes 49 for receiving the ring 39 is provided on the ring and contacts the outer surfaces of the eyelets 47 to hold them in clustered condition.

The embodiment shown in Figs. 4–6 may be economically manufactured by mounting the kite-like setting plates to the shanks of hooks in any suitable manner such as soldering, welding and the like.

When a fish attempts to throw the device by discharging water from its mouth, the water will be directed between the plates or bodies 34, 35 by the curved trailing ends of the bodies against the setting surfaces 42 and 43 and the force of the water will cause a transversely outward relative hinging of the first member 44 and second member 45 to accomplish setting of the hooks in the fish.

It will be noted that in the modification shown in Figs. 1–3 and the modification shown in Figs. 4–6 the leading ends of the plates are extended forwardly and transversely outwardly from the hinge means. This feature causes the hooks to be forced closely together as the fish sucks water into its mouth in an effort to consume the bait. This flow of water against the inner surface 65 (Figs. 1–3) of the leading end of the body forces the hooks into adjacent side-by-side relationship. When the fish tries to expel the hooks by forcing water out of its mouth, the outer surface 66 (Figs. 1–3) of the leading end of the body 16 is affected by this flow of water and causes an initial opening movement of the hooks thereby placing the planar setting surface 33 and the underside of the body 17 of Figs. 1–3 in the path of the flow of water whereby continued outward setting movements of the hooks is effected. Similarly, in the modification of Figs. 4–6, the hooks are held in side-by-side relationship by the flow of water against the inner surfaces 65', 65' and outward movement is initiated by outward water flow against the outer surfaces 66', 66' of the curved leading ends so that the setting surfaces 42 and 43 are initially moved to interrupt the flow of water out of the mouth of the fish, and thereby continue the desired opening movement of the hooks. It will be noted also that the trailing ends of the plates extend rearwardly and outwardly to provide surfaces which assist in causing the initial outward movement of the hooks.

Various modifications of this invention will be apparent to those skilled in the art and for that reason I wish to limit myself only within the scope of the appended claims.

I claim:

1. In a fish catching device, a first member including a first longitudinally extending body having a leading end and a trailing end and a first U-shaped hook portion extending from the trailing end transversely outwardly of its longitudinally extending body, a second member including a second longitudinally extending body having a leading end and a trailing end and a second U-shaped hook portion extending from the trailing end transversely outwardly of its longitudinally extending body in a transverse direction opposite to said first U-shaped hook portion, means for hingedly connecting said second body to said first body for movement from a side-by-side closed position outwardly in the direction of its respective hook portion to an open set position, said first body and said second body being forced into side-by-side relation when pulled through water with their leading ends forward, said second body having a substantially planar setting surface of predetermined area positioned adjacent the first body when in closed position for receiving a setting force by a fish discharging water thereby causing outward relative hinging movement of said first member and said second member to set position to set the hook portions in the fish, and means on the leading end of at least one of said members adapted for attachment to a fishing line, said second body including a leading end which extends forwardly and outwardly from said first body to cause biasing of said hook portions to closed position when water is drawn rearwardly by the fish and to assist in initiating opening movement when water is forced forwardly by the fish.

2. In a fish catching device, a first member including a first longitudinally extending plate having a leading end and a trailing end and a first U-shaped hook portion extending from the trailing end transversely outwardly of its longitudinally extending plate, a second member including a second longitudinally extending plate having a leading end and a trailing end and a second U-shaped hook portion extending from the trailing end transversely outwardly of its longitudinally extending plate in a direction transversely opposite to said first U-shaped hook portion, and hinge means connecting the leading ends of said first and second members together to enable movement from a side-by-side closed position outwardly in the direction of the respective hook portions to an open set position, said first plate and said second plate being in substantially face-to-face engagement in closed position and their adjacent faces providing setting surfaces for receiving a setting force by a fish discharging water to cause outward hinging movement of said first member and said second member to set position to set the hook portions in the fish, the leading ends of said first and second plates extending forwardly and outwardly in opposite directions from their respective plates to cause biasing of said hook portions to closed position when water is drawn rearwardly by the fish and to assist in initiating opening movement when water is forced forwardly by the fish.

References Cited in the file of this patent

UNITED STATES PATENTS

| | | |
|---|---|---|
| 1,312,824 | Boman | Aug. 12, 1919 |
| 2,250,478 | Franks | July 29, 1941 |
| 2,605,571 | Fasano et al. | Aug. 5, 1952 |
| 2,643,479 | Stevenson | June 30, 1953 |
| 2,675,639 | Borgen | Apr. 20, 1954 |